(12) United States Patent
Kiyohara (10) Patent No.: US 8,591,091 B2
(45) Date of Patent: Nov. 26, 2013

(54) SURFACE LIGHT SOURCE DEVICE AND DISPLAY DEVICE

(75) Inventor: Toru Kiyohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 206 days.

(21) Appl. No.: 13/016,244

(22) Filed: Jan. 28, 2011

(65) Prior Publication Data

US 2011/0205755 A1    Aug. 25, 2011

(30) Foreign Application Priority Data

Feb. 19, 2010  (JP) ................................. 2010-034287
Dec. 10, 2010  (JP) ................................. 2010-275364

(51) Int. Cl.
*F21V 7/04*  (2006.01)

(52) U.S. Cl.
USPC .......................................... 362/628; 362/612

(58) Field of Classification Search
USPC .............................. 362/612, 621, 628; 349/65
See application file for complete search history.

(56) References Cited

U.S. PATENT DOCUMENTS

| 7,543,970 B2 | 6/2009 | Kiyohara et al. | |
| 7,810,262 B2 * | 10/2010 | Sadon | 40/546 |
| 2008/0049168 A1 * | 2/2008 | Kubota | 349/65 |
| 2009/0273730 A1 * | 11/2009 | Mills | 349/65 |
| 2009/0279020 A1 * | 11/2009 | Tanabe | 349/65 |

FOREIGN PATENT DOCUMENTS

JP    8-236814    9/1996

* cited by examiner

*Primary Examiner* — Jason Moon Han
(74) *Attorney, Agent, or Firm* — Oblon, Spivak, McClelland, Maier & Neustadt, L.L.P.

(57) ABSTRACT

Provided is a surface light source device including a light guide plate, and at least one point light source that is disposed to be adjacent to an incidence surface of the light guide plate and irradiates the incidence surface with a light beam. The light guide plate includes, at least at a position at which the point light source is disposed, at least one projection projecting from the incidence surface toward a direction in which the point light source is disposed.

5 Claims, 5 Drawing Sheets

SURFACE LIGHT SOURCE DEVICE AND DISPLAY DEVICE

BACKGROUND OF THE INVENTION

1. Field of the Invention

The present invention relates to a surface light source device and a display device using the same.

2. Description of the Background Art

Surface light source devices, which irradiate a rear surface of a display element such as a liquid crystal panel with a light beam to illuminate a display screen from a back surface, include side light type and direct type ones. Light sources are arranged on side surfaces of a casing in the side light type (also referred to as edge light type) surface light source device, while a light source is arranged on a rear surface of a casing by being opposed to a liquid crystal panel in the direct type surface light source device.

Further, the side light type surface light source devices include devices in which a light guide plate is used for guiding a light beam from a light source to an opening of a casing. In a surface light source device using a light guide plate, the light beam emitted from a side light portion including a line light source such as a cold cathode fluorescent lamp (CCFL) or point light sources such as light emitting diodes (LEDs) is reflected within the light guide plate and diffused in a diffusion pattern provided in the light guide plate, to thereby extract the light beam from the opening in a planar manner.

As to a side light type surface light source device using point light sources such as LEDs, for example, Japanese Patent Application Laid-Open No. 08-236814 proposes a surface light source device in which a support separate from a light guide plate is provided to an incident surface of the light guide plate, and LEDs are inserted through through holes provided in the support to be supported by and fixed to the support. It is described that in this surface light source device, LED lamps and the support can be prevented from becoming misaligned by welding or bonding the LED lamps to the support, and accordingly the light guide plate and the LEDs do not become misaligned, which does not impair the efficiency of incidence on the light guide plate.

However, in a conventional surface light source device as described above, a light guide plate and a support for supporting and fixing the LEDs that is provided separately from the light guide plate are provided, and LED lamps and the support are fixed by welding. This causes drawbacks that an interface of a welding portion becomes uneven, leading to diffuse reflection of incident light beams, and that a material for the support is limited in terms of welding and bonding properties for the LED lamps. Further, an insertion groove for inserting an edge of the light guide plate thereinto is provided in the support, where point light sources become misaligned in a case where a light guide plate is deformed, for example, is warped. Moreover, the drawback is that the support needs to be used for fixing the LEDs, which increases the number of components and makes the assembly more difficult.

SUMMARY OF THE INVENTION

An object of the present invention is to provide a surface light source device that is easily assembled, supports and fixes point light sources and a light guide plate so as not to become misaligned without increasing the number of components, and is capable of causing light beams emitted from the point light sources to be incident on the light guide plate with efficiency.

A surface light source device according to the present invention includes a light guide plate and at least one point light source.

The point light source is disposed to be adjacent to an incidence surface of the light guide plate and irradiates the incidence surface with a light beam.

The light guide plate includes, at least at a position at which the point light source is disposed, at least one projection projecting from the incidence surface toward a direction in which the point light source is disposed.

Even in a case where the light guide plate is deformed, for example, is warped, the position of the point light source with respect to the incidence surface is fixed by disposing the point light source to abut against the projection of the light guide plate. Accordingly, there is no reduction in efficiency with which the light beam emitted from the point light source is incident on the incidence surface of the light guide plate. Further, a support or the like is not required separately, which makes the assembly easier.

These and other objects, features, aspects and advantages of the present invention will become more apparent from the following detailed description of the present invention when taken in conjunction with the accompanying drawings.

DESCRIPTION OF THE PREFERRED EMBODIMENTS (First Preferred Embodiment)

<Configuration>

Figure 1:
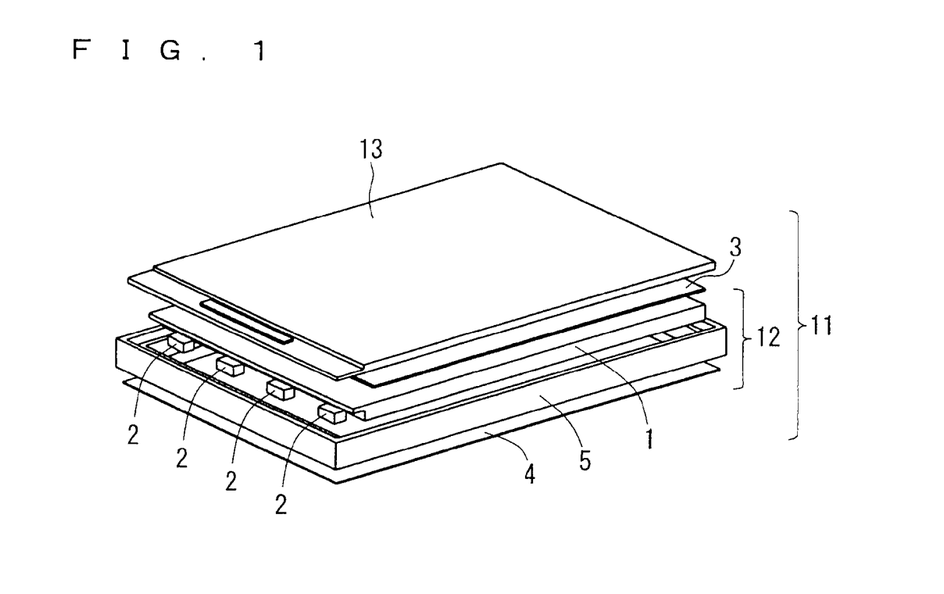
FIG. 1 is a perspective view showing a configuration of a display device according to a first preferred embodiment.
Figure 2:
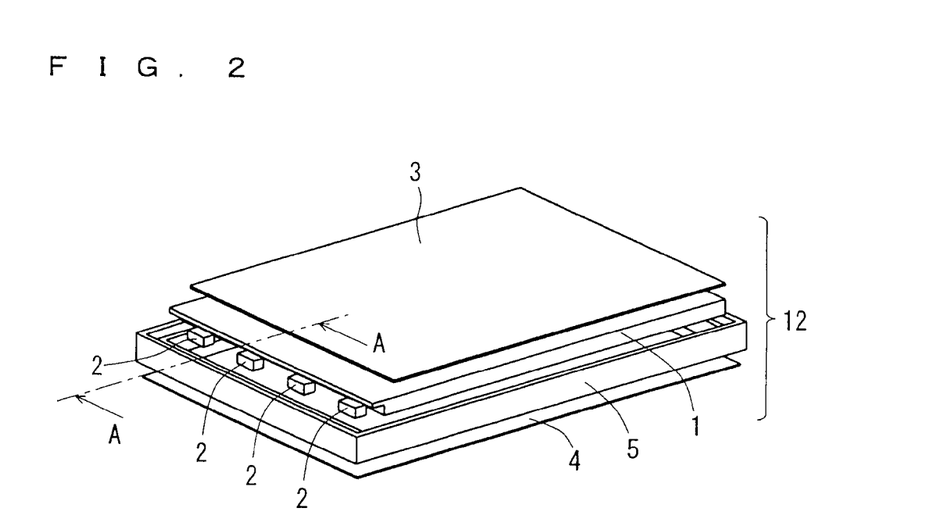
FIG. 2 is a perspective view showing a configuration of a surface light source device according to the first preferred embodiment.
Figure 3:
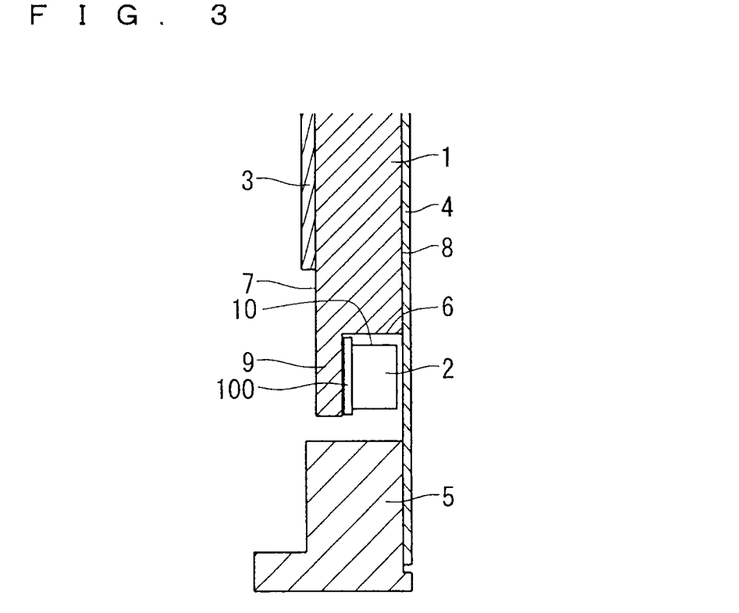
FIG. 3 is a partial cross-sectional view of the surface light source device according to the first preferred embodiment.

FIG. 1 is a perspective view showing a configuration of a display device 11 including a surface light source device 12 according to this preferred embodiment, and FIG. 2 is a perspective view showing a configuration of the surface light source device 12 according to this preferred embodiment. FIG. 3 is a partial cross-sectional view of the surface light source device 12, which is taken along the direction A-A of FIG. 2.

As shown in FIG. 2, the surface light source device 12 includes a light guide plate 1 formed of a transparent acrylic resin, one or a plurality of point light sources 2 disposed to the light guide plate 1, an optical sheet 3 provided on a front surface of the light guide plate 1, a reflective sheet 4 provided on the back surface of the light guide plate 1, and a casing 5 that encloses the light guide plate 1 and the point light sources 2.

With reference to FIG. 3, the light guide plate 1 includes an incidence surface 6 on which the light beams from the point light sources 2 are incident, an exit surface 7 from which the light beams that have been incident on the incidence surface 6 and propagated through the light guide plate 1 exit, and a reflective surface 8 opposed to the exit surface 7. Note that in the following description, the exit surface 7 side is an upper portion and the reflective surface 8 side is a lower portion (bottom). A dot pattern or a prism structure is formed on the typical exit surface 7 and reflective surface 8, which causes the light beams incident on the incidence surface 6 to exit substantially from the entire exit surface 7 in a planar manner. The light guide plate 1 may be formed of an acrylic resin, and besides, a polycarbonate (PC) resin or a cycloolefin resin. In the case where the light guide plate 1 is formed of the above-mentioned material, there occurs less changes in dimension due to a temperature change, whereby the surface light source device 12 can be used in a wider temperature range.

The light beams emitted from the point light sources 2 formed of light emitting diodes are incident on the incidence surface 6 of the light guide plate 1, propagate through the light guide plate 1, and then exit from the exit surface 7.

The optical sheet 3 is disposed in proximity to the exit surface 7 of the light guide plate 1, which improves the luminance by bringing an advancing direction of the light beam from the exit surface 7 close to the direction of the normal to the display surface of a display element (liquid crystal panel 13). A diffusion sheet, a prism sheet, a polarized reflection sheet or the like is used for the optical sheet 3, and the optical sheet 3 may be formed of any one of those or combination of at least one of those in accordance with desired characteristics. Alternatively, the optical sheet 3 is not used in some cases.

The reflective sheet 4 is disposed in proximity to the reflective surface 8 of the light guide plate 1 and causes the light beam that has passed through the reflective surface 8 of the light guide plate 1 to be reflected on the light guide plate 1. The reflective sheet 4 is preferably a sheet having high reflectance. Further, while the reflective sheet 4 is disposed below the casing 5 in FIG. 1 to FIG. 3, not limited thereto, the reflective sheet 4 may be contained in the casing 5 together with the light guide plate 1 and the point light sources 2. The casing 5 is formed of a synthetic resin such as a polycarbonate (PC) resin or an ABS resin. Further, loss of the light beams emitted from the light sources can be reduced by using a high reflectance material for or applying a white coating onto the material of the casing 5, which is desirable.

As shown in FIG. 1, the liquid crystal panel 13 is disposed as a display element on the exit surface of the surface light source device 12 configured as described above, whereby the display device 11 is formed. A flexible printed circuit (FPC) (not shown), a tape carrier package (TCP) (not shown) and the like are connected to the liquid crystal panel 13, and a video signal is input to the liquid crystal panel 13. The light beam from the surface light source device 12 that has reached the liquid crystal panel 13 is modulated in accordance with the video signal and displays respective RGB colors.

<Eaves Portion>

The point light sources 2 are provided so as to be opposed to the incidence surface 6 of the light guide plate 1, which are disposed along the longitudinal direction of the incidence surface 6 in a case where a plurality of point light sources 2 are used. The point light sources 2 are mounted on a printed circuit board, an FPC or the like in which a wiring pattern is formed, and are supplied with electric power. Here, an FPC 100 is used to form a light source substrate on which the point light sources 2 are mounted. Used for the point light sources 2 are side-view white LEDs whose light emitting direction (exit direction of a light beam) is substantially parallel to the mounting surface.

With reference to FIG. 3, the light guide plate 1 includes an eaves portion 9 projecting from the incidence surface 6. The eaves portion 9 is a part of the incidence surface 6 of the light guide plate 1 on the exit surface 7 side, which projects over an almost entire width of the exit surface 7 toward the direction in which the point light sources 2 are disposed. The point light sources 2 are provided on the lower surface (surface opposite to the exit surface 7) of the eaves portion 9 of the light guide plate 1 through the FPC 100, and light emitting surfaces 10 of the point light sources 2 are disposed so as to be close to or abut against the incidence surface 6 of the light guide plate 1. The point light sources 2 and the light guide plate 1 are contained in the casing 5. In this manner, the point light sources 2 are arranged in an area surrounded by the eaves portion 9 and the incidence surface 6 of the light guide plate 1, the casing 5 and the reflective sheet 4.

As described above, the surface light source device according to the first preferred embodiment includes the light guide plate 1 and at least one point light source 2 that is disposed to be adjacent to the incidence surface 6 of the light guide plate 1 and irradiates the incidence surface 6 with a light beam, in which the light guide plate 1 includes, at least a position at which the point light source 2 is disposed, at least one eaves portion 9 (projection) that projects from the incidence surface 6 toward the direction in which the point light source 2 is disposed. The eaves portion 9 is disposed so as to project from the exit surface 7 side of the incidence surface 6 of the light guide plate 1, and the point light source 2 is disposed so as to abut against the eaves portion 9 and the incidence surface 6, with the result that, even in a case where the light guide plate 1 is deformed, for example, is warped, the point light source 2 is fixed to a position of the light guide plate 1 that is opposed to the incidence surface 6 of the light guide plate 1 without projecting toward the exit surface 7 side of the light guide plate 1. Further, the FPC 100 on which the point light source 2 is mounted expands or contracts due to the heat generated as a result of the point light source 2 turning on or a temperature change of surroundings, and thus the point light source 2 is fixed to the position opposed to the incidence surface of the light guide plate 1 without projecting toward the exit surface 7 side of the light guide plate 1 owing to the eaves portion 9 even in a situation where the point light source 2 becomes misaligned. Accordingly, it is possible to guide most of the light beam emitted from the point light source 2 to the incidence surface 6 of the light guide plate 1 with reliability. For this reason, almost all of the light beam emitted from the point light source 2 can be caused to be incident on the incidence surface 6 of the light guide plate 1, to thereby efficiently use the light beam emitted from the point light source 2. In addition, it is possible to prevent a reduction in luminance of the surface light source device 12 or abnormal light emitting resulting from the fact that a light beam is not incident on the incidence surface 6 but leaks outside the incidence surface 6.

The display device 11 including the above-mentioned surface light source device 12 and the liquid crystal panel 13 disposed on the exit surface thereof has excellent incidence efficiency from the above-mentioned reasons.

It suffices that the eaves portion 9 has at least such a projecting amount as to cover all of the point light sources 2 in a case where the light emitting surfaces 10 of the point light sources 2 are disposed to abut against or be close to the incidence surface 6 of the light guide plate 1. Preferably, the eaves portion 9 covers the point light sources 2 and projects beyond the point light sources 2 by approximately 1 mm. The thickness of the eaves portion 9 is desirably as small as possible in the range in which the eaves portion 9 is formable by injection mold. Preferably, the thickness thereof is 0.3 mm or larger and 0.5 mm or smaller.

<Modification>

Figure 4:
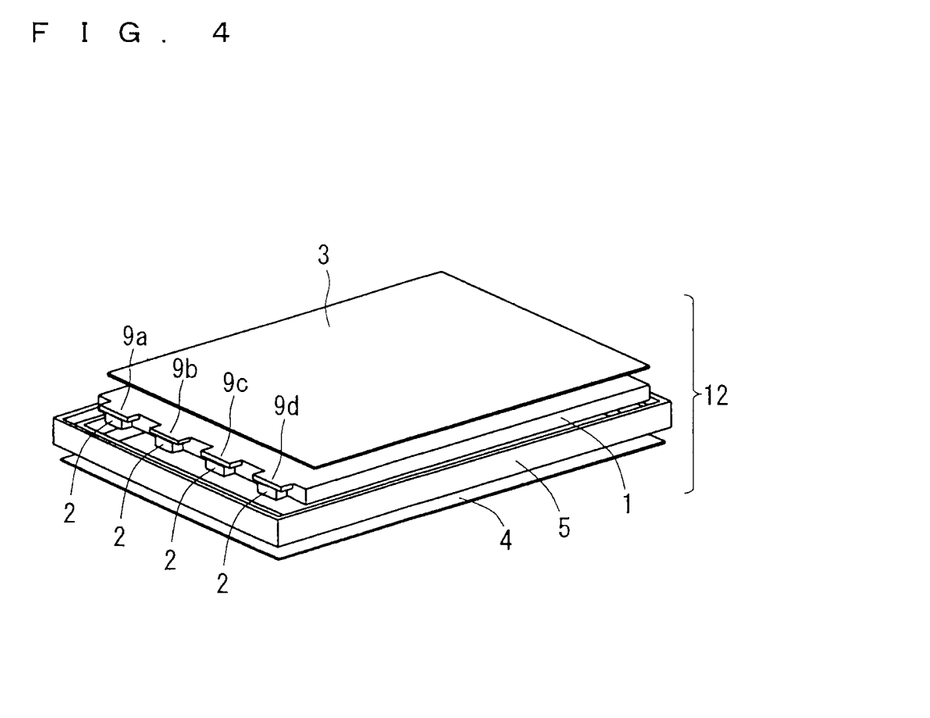
FIG. 4 is a perspective view showing a configuration of another surface light source device according to the first preferred embodiment.

While the eaves portion 9 is formed entirely in the width direction of the incidence surface 6 of the light guide plate 1 in FIGS. 1 and 2, the eaves portion 9 may be provided only in a part in which the point light source 2 is disposed. In FIG. 4, eaves portions 9a, 9b, 9c and 9d that project from the incidence surface 6 of the light guide plate 1 are provided only in parts where the point light sources 2 are arranged. Eaves portions are discretely provided correspondingly to the positions at which the point light sources 2 are disposed in this manner, and accordingly the influence of a dimensional change of the light guide plate 1 due to a temperature change or a humidity change or a shape change of the light guide plate 1 due to a warp or the like is dispersed, and thus the point light sources 2 are less likely to be misaligned.

<Effects>

According to the surface light source device of this preferred embodiment, the following effects are achieved as described above. That is, the surface light source device 12 according to the first preferred embodiment includes: the light guide plate 1; and at least one point light source 2 that is provided to be adjacent to the incidence surface 6 of the light guide plate 1 and irradiates the incidence surface 6 with a light beam, wherein the light guide plate 1 includes, at least at a position at which the point light source 2 is disposed, at least one eaves portion 9 (projection) projecting from the incidence surface 6 toward the direction in which the point light source 2 is disposed. When the point light source 2 is disposed to abut against the eaves portion 9 that projects from the incidence surface 6, the position of the point light source 2 is fixed by the eaves portion 9 even in a case where the light guide plate 1 is deformed, for example, is warped. Accordingly, there is no reduction in the efficiency with which the light beam emitted from the point light source 2 is incident on the incidence surface 6 of the light guide plate 1. Moreover, there is another advantage that the surface light source device is easily assembled because a separate support or the like is not required.

Further, the point light source 2 is disposed to abut against the eaves portion 9 (projection) and the incidence surface 6 of the light guide plate 1. Accordingly, even in a case where the light guide plate 1 is deformed, for example, is warped, the point light source 2 is fixed to the position opposed to the incidence surface 6 by the eaves portion 9, and hence the incidence efficiency is not reduced.

Further, the light guide plate 1 includes: the exit surface 7 perpendicular to the incidence surface 6, from which the light beam from the point light source 2 is emitted; and the reflective surface 8 opposed to the exit surface 7, wherein the eaves portion 9 (projection) is provided only on the exit surface 7 side of the incidence surface 6. Accordingly, even in a case where the light guide plate 1 is deformed, for example, is warped, the point light source 2 is fixed to the position opposed to the incidence surface 6 without becoming misaligned toward the exit surface 7 side, and hence the incidence efficiency is not reduced.

Further, the eaves portions 9 (projections) are discretely provided correspondingly to the positions at which the point light sources 2 are disposed. Accordingly, the influence of a dimensional change of the light guide plate 1 due to a temperature change or a humidity change or a shape change of the light guide plate 1 due to a warp or the like is dispersed, whereby the point light sources 2 are less likely to be misaligned.

The display device 11 according to this preferred embodiment includes the above-mentioned surface light source device 12 according to this preferred embodiment and the liquid crystal panel 13 (display panel) disposed on the exit surface 7 of the surface light source device 12. Accordingly, there is obtained a display device easily assembled, in which the incidence efficiency is prevented from reducing even when the light guide plate 1 is deformed.

(Second Preferred Embodiment)

<Configuration>

Figure 5:
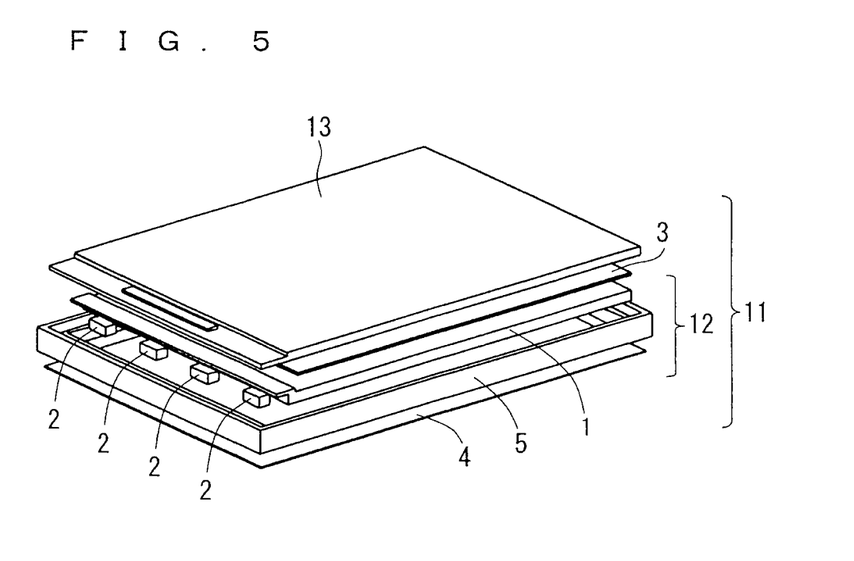
FIG. 5 is a perspective view showing a configuration of a display device according to a second preferred embodiment.
Figure 6:
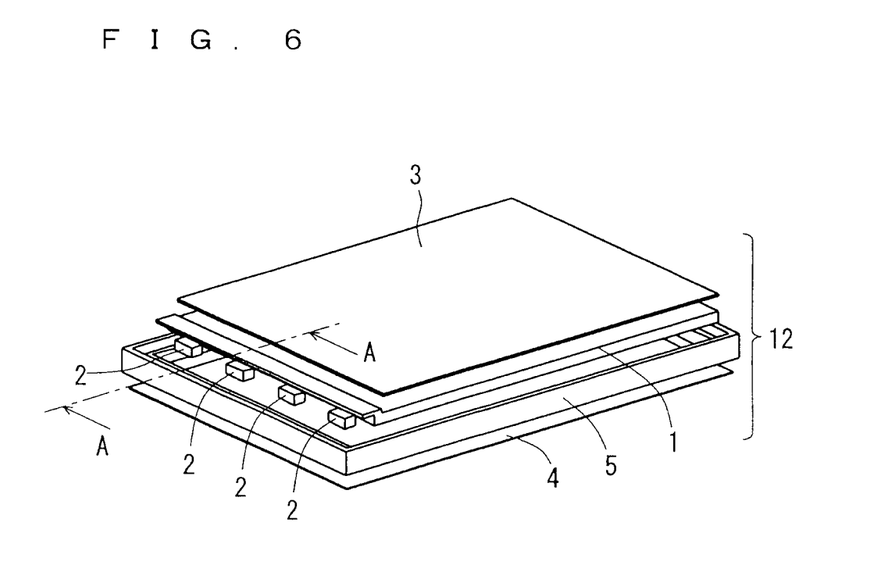
FIG. 6 is a perspective view showing a configuration of a surface light source device according to the second preferred embodiment.
Figure 7:
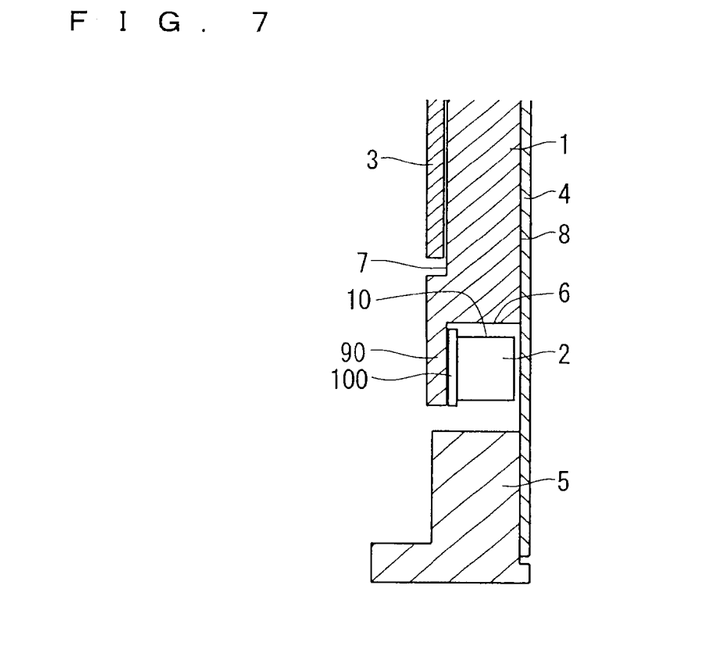
FIG. 7 is a partial cross-sectional view showing the surface light source device according to the second preferred embodiment.

FIG. 5 is a perspective view showing the configuration of the display device 11 including the surface light source device 12 according to this preferred embodiment, and FIG. 6 is a perspective view showing the configuration of the surface light source device 12 according to this preferred embodiment. FIG. 7 is a partial cross-sectional view of the surface light source device 12, which is taken along the A-A direction of FIG. 6. While the eaves portion 9 is disposed such that the upper surface of the eaves portion 9 is flush with the exit surface 7 of the light guide plate 1 in the first preferred embodiment, in the second preferred embodiment, an eaves portion 90 is disposed in such a step manner as to be higher than the exit surface 7. The configuration other than the eaves portion 90 is similar to that of the first preferred embodiment, and thus description thereof is omitted.

The eaves portion 90 is provided outside the display area of the liquid crystal panel 13, and the height of the step generated between the eaves portion 90 and the exit surface 7 of the light guide plate 1 is set to be equal to the thickness of the optical sheet 3 disposed on the exit surface 7 of the light guide plate 1. The height of the step may be changed in accordance with the configuration or thickness of the optical sheet 3. Besides, a projecting amount of the eaves portion 90 from the incidence surface 6 and the thickness thereof are similar to those of the first preferred embodiment.

In this manner, the eaves portion 90 on the exit surface 7 side of the light guide plate 1 is disposed in such a step manner as to be higher than the exit surface 7, and the step between the upper surface of the eaves portion 90 and the exit surface 7 is set to be equal to the thickness of the optical sheet 3 disposed on the exit surface 7. Accordingly, the eaves portion 90 can be disposed without increasing the thickness of the entire surface light source device 12, which makes it possible to slim down the surface light source device 12.

<Modification>

Figure 8:
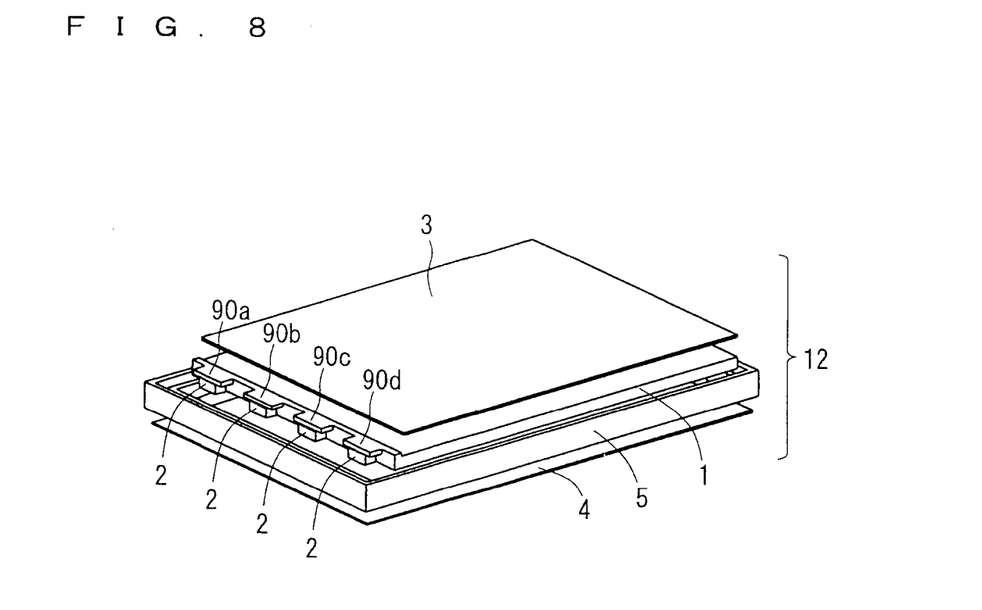
FIG. 8 is a perspective view showing a configuration of another surface light source device according to the second preferred embodiment.

As shown in FIG. 4 according to the first preferred embodiment, also in the second preferred embodiment, the eaves portions 90 may be provided only in parts where the point light sources 2 are disposed without being formed entirely in the width direction of the incidence surface 6 of the light guide plate 1. In FIG. 8, eaves portions 90a, 90b, 90c and 90d that project from the incidence surface 6 of the light guide plate 1 are provided only in the parts where the point light sources 2 are disposed. Eaves portions are discretely provided in this manner, and accordingly the influence of a dimensional change of the light guide plate 1 due to a temperature change or a humidity change or a shape change of the light guide plate 1 due to a warp or the like is dispersed, and thus the point light sources 2 are less likely to be misaligned.

<Effects>

According to the surface light source device of this preferred embodiment, the following effects are achieved. That is, in the surface light source device 12 according to the second preferred embodiment, the eaves portion 90 (projection) on the exit surface 7 side is provided in such a step manner as to be higher than the exit surface 7. When the step between the upper surface of the eaves portion 90 and the exit surface 7 is set to be equal to the thickness of the optical sheet 3 disposed on the exit surface 7, it is possible to dispose the eaves portion 90 without increasing the thickness of the entire surface light source device 12. Accordingly, a surface light source device having excellent incidence efficiency is obtained.

(Third Preferred Embodiment)

<Configuration>

Figure 9:
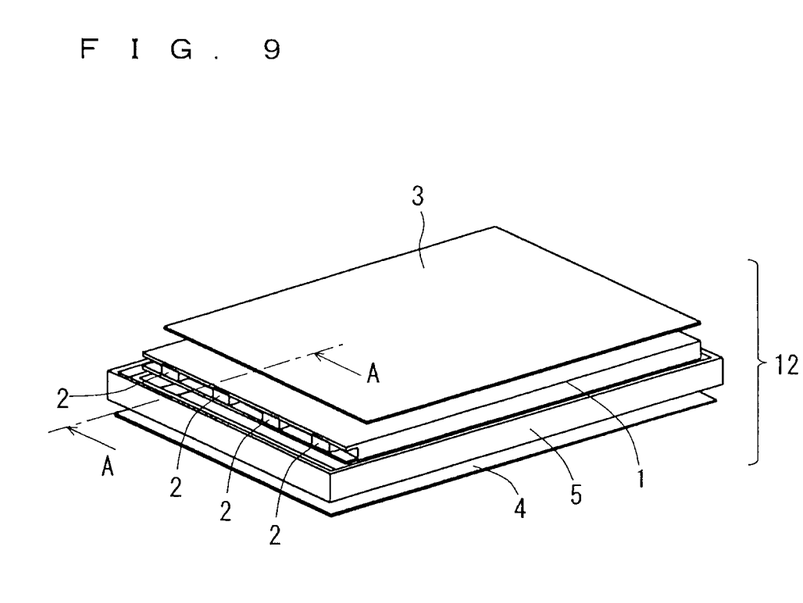
FIG. 9 is a perspective view showing a configuration of a surface light source device according to a third preferred embodiment.
Figure 10:
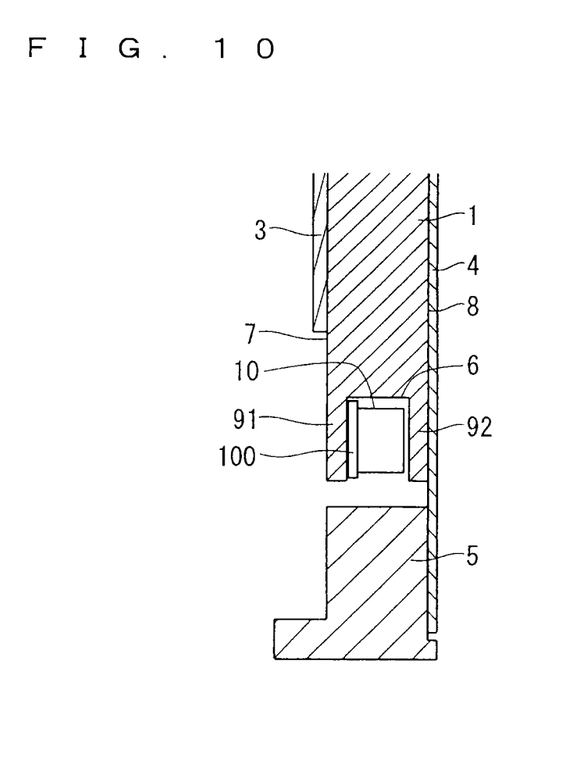
FIG. 10 is a partial cross-sectional view of the surface light source device according to the third preferred embodiment.

FIG. 9 is a perspective view showing the configuration of the surface light source device 12 according to this preferred embodiment. FIG. 10 is a partial cross-sectional view of the surface light source device 12, which is taken along the A-A direction of FIG. 9. While the eaves portion 9, 90 is disposed only on the exit surface 7 side of the light guide plate 1 in the first, second preferred embodiment, in the third preferred embodiment, a first eaves portion 91 and a second eaves portion 92 are formed on the exit surface 7 side and the reflective surface 8 side of the incidence surface of the light guide plate 1, as shown in FIGS. 9 and 10. The configuration other than the eaves portions 91 and 92 is similar to that of the first preferred embodiment, and thus description thereof is omitted.

On the incidence surface 6 of the light guide plate 1, the first eaves portion 91 and the second eaves portion 92 are provided on the exit surface 7 side and the reflective surface 8 side that is opposed to the exit surface 7 so as to project toward the direction in which the point light sources 2 are disposed. The point light sources 2 are disposed between the lower surface of the first eaves portion 91 and the upper surface of the second eaves portion 92 through the FPC 100. The point light sources 2 may be disposed on the lower surface of the eaves portion 91 through the FPC 100 or may be disposed on the upper surface of the eaves portion 92. As in the first preferred embodiment, the thicknesses of the eaves portions 91 and 92 are preferably 0.3 mm or larger and 0.5 mm or smaller.

That is, the light guide plate 1 includes: the exit surface 7 perpendicular to the incidence surface 6, from which the light beams from the point light sources 2 are emitted; and the reflective surface 8 opposed to the exit surface 7, wherein eaves portions (projections) are respectively provided on the exit surface 7 side of the incidence surface 6 (eaves portion 91) and the reflective surface 8 side thereof (eaves portion 92), and the point light sources 2 are fixed between these two eaves portions 91 and 92. For example, the eaves portion 91 is provided so as to be in contact with the upper portions of the point light sources 2 and the eaves portion 92 is provided so as to be in contact with the lower portions of the point light sources 2, which further prevents the point light sources 2 from becoming misaligned.

<Modification>

Similarly to FIG. 4 according to the first preferred embodiment and FIG. 8 according to the second preferred embodiment, the eaves portions 91 and 92 are not required to be formed entirely in the width direction of the exit surface 7 of the light guide plate 1, and the eaves portions may be provided only in the parts where the point light sources 2 are disposed.

The eaves portions 91 and 92 are discretely provided in this manner, and accordingly, the influence of a dimensional change of the light guide plate 1 due to a temperature change or a humidity change or a shape change of the light guide plate 1 due to a warp or the like is dispersed, whereby the point light sources 2 are less likely to be misaligned.

While in FIGS. 9 and 10, the eaves portions 91 and 92 are disposed such that the upper surface of the eaves portion 91 is flush with the exit surface 7 of the light guide plate 1 as in the first preferred embodiment, the first eaves portion 91 on the exit surface 7 side may be disposed in such a step manner as to be higher than the exit surface 7 as described in the second preferred embodiment. The eave portion 91 of the light guide plate 1 is disposed in such a step manner as to be higher than the exit surface 7, and the step between the upper surface of the eaves portion 91 and the exit surface 7 is set to be equal to the thickness of the optical sheet 3 disposed on the exit surface 7, whereby the eaves portions 91 and 92 can be disposed without increasing the thickness of the entire surface light source device 12. Accordingly, it is possible to slim down the surface light source device 12.

<Effects>

According to the surface light source device of this preferred embodiment, the following effects are achieved as described above. That is, in the surface light source device 12 according to the third preferred embodiment, the light guide plate 1 includes: the exit surface 7 perpendicular to the incidence surface 6, from which the light beams from the source light sources 2 are emitted; and the reflective surface 8 opposed to the exit surface 7, wherein the eaves portions (projections) are respectively provided on the exit surface 7 side (eaves portion 91) and the reflective surface 8 side (eaves portion 92) of the incidence surface 6, and the point light sources 2 are fixed between these two eaves portions 91 and 92.

While the invention has been shown and described in detail, the foregoing description is in all aspects illustrative and not restrictive. It is therefore understood that numerous modifications and variations can be devised without departing from the scope of the invention.

What is claimed is:

1. A surface light source device, comprising:
a generally rectangular light guide plate comprising a plate shaped member having:
   a first generally planar major surface terminating at an outermost peripheral edge of the light guide plate,
   a second generally planar major surface opposite the first major surface,
   a reflective sheet provided at the second generally planar major surface, whereby the first generally planar major surface comprises a light exit surface from which light may be emitted,
   a side surface extending at least partially from the first generally planar major surface toward the second generally planar major surface, at the outermost peripheral edge of the light guide plate,
   a recess located between the first generally planar major surface and the second generally planar major surface, the recess extending inwardly from the side surface and into the plate shaped member to provide a light incident surface extending perpendicular to the first generally planar major surface and located inwardly from the side surface,
   first projections each comprising a first surface at the first generally planar major surface adjacent the outermost peripheral edge of the light guide plate, and a second surface extending parallel to the first surface of the projection and formed by a surface of the recess from the outermost peripheral edge of the light guide plate toward the light incident surface; and a plurality of side view point light sources mounted correspondingly to each said second surface of said first projections and in said recess adjacent to said light incidence surface, whereby light from said side view point light sources entering said light guide plate at said light incident surface will exit said light guide plate at said light exit surface.

2. The surface light source device according to claim 1, wherein said at least one point light source is disposed to abut against said light incidence surface.

3. The surface light source device according to claim 1, wherein said first surface of the first projection forms a step and is higher than a remainder of said first generally planar major surface.

4. A display device, comprising:
the surface light source device according to claim 1; and
a display panel disposed on the light exit surface of said surface light source device.

5. A surface light source device, comprising:
a generally rectangular light guide plate comprising a plate shaped member having:
 a first generally planar major surface terminating at an outermost peripheral edge of the light guide plate,
 a second generally planar major surface opposite the first major surface,
 a reflective sheet provided at the second generally planar major surface, whereby the first generally planar major surface comprises a light exit surface from which light may be emitted,
 a side surface extending at least partially from the first generally planar major surface toward the second generally planar major surface, at the outermost peripheral edge of the light guide plate,
 a recess located between the first generally planar major surface and the second generally planar major surface, the recess extending inwardly from the side surface and into the plate shaped member to provide a light incident surface extending perpendicular to the first generally planar major surface and located inwardly from the side surface,
 a first projection comprising a first surface at the first generally planar major surface adjacent the outermost peripheral edge of the light guide plate, and a second surface extending parallel to the first surface of the projection and formed by a surface of the recess from the outermost peripheral edge of the light guide plate toward the light incident surface;
at least one side view point light source mounted to said second surface of said first projection and in said recess adjacent to said light incidence surface, whereby light from said side view point light source entering said light guide plate at said light incident surface will exit said light guide plate at said light exit surface; and
another projection, the another projection comprising a first surface at the second generally planar major surface, and a second surface extending parallel to the first surface of the another projection and formed by another surface of the recess.

* * * * *